(12) United States Patent
Morell

(10) Patent No.: US 11,719,924 B2
(45) Date of Patent: Aug. 8, 2023

(54) VIEWING OPTIC WITH A SOLAR PANEL

(71) Applicant: Sheltered Wings, Inc., Barneveld, WI (US)

(72) Inventor: Rob Morell, Barneveld, WI (US)

(73) Assignee: SHELTERED WINGS INC., Barneveld, WI (US)

( * ) Notice: Subject to any disclaimer, the term of this patent is extended or adjusted under 35 U.S.C. 154(b) by 0 days.

(21) Appl. No.: 17/505,035

(22) Filed: Oct. 19, 2021

(65) Prior Publication Data

US 2022/0121024 A1   Apr. 21, 2022

Related U.S. Application Data

(60) Provisional application No. 63/093,891, filed on Oct. 20, 2020.

(51) Int. Cl.
*G02B 23/16* (2006.01)
*F41G 1/34* (2006.01)
*H02S 40/34* (2014.01)

(52) U.S. Cl.
CPC ............ *G02B 23/16* (2013.01); *F41G 1/345* (2013.01); *H02S 40/34* (2014.12)

(58) Field of Classification Search
CPC .......... G02B 23/16; H02S 40/34; F41G 1/345
See application file for complete search history.

(56) References Cited

U.S. PATENT DOCUMENTS

| | | | |
|---|---|---|---|
| 9,163,902 B1 * | 10/2015 | Cheng | F41G 1/38 |
| 9,453,706 B1 * | 9/2016 | Crispin | F41G 1/26 |
| D819,160 S * | 5/2018 | Hamilton | D22/109 |
| 2014/0237884 A1 * | 8/2014 | Koesler | F41G 1/38 42/111 |
| 2014/0259853 A1 | 9/2014 | Crispin | |
| 2017/0038177 A1 * | 2/2017 | Sun | F41G 11/003 |
| 2017/0363387 A1 | 12/2017 | Sun et al. | |
| 2021/0207928 A1 * | 7/2021 | Brewer | F41G 1/16 |
| 2021/0262759 A1 * | 8/2021 | Sun | F41G 11/001 |
| 2021/0349300 A1 * | 11/2021 | Sheets, Jr. | F41G 1/38 |
| 2022/0244015 A1 * | 8/2022 | Sun | F41G 1/30 |

OTHER PUBLICATIONS

International Search Report and Written Opinion for International Application No. PCT/US2021/055585 dated Jan. 28, 2022, 9 pages.

* cited by examiner

*Primary Examiner* — Joshua E Freeman
(74) *Attorney, Agent, or Firm* — Husch Blackwell LLP

(57) ABSTRACT

A viewing optic has a housing having a front side containing an optical element, a rear side containing a rear cover, a left side, a right side, and top side. A solar panel control assembly with at least one solar panel is positioned on the top side. The viewing optic may be a miniature red dot sight, such as a closed red dot sight.

15 Claims, 5 Drawing Sheets

VIEWING OPTIC WITH A SOLAR PANEL

CROSS-REFERENCE TO RELATED APPLICATIONS

This application is a non-provisional application of and claims priority to U.S. Provisional Patent Application No. 63/093,891 filed Oct. 20, 2021, which is incorporated herein by reference in its entirety.

FIELD

The disclosure relates to a viewing optic. In one embodiment, the disclosure relates to a miniature red dot sight for a firearm. In one embodiment, the disclosure relates to a miniature red dot sight with a solar panel control assembly.

BACKGROUND

Miniature red dot sights (MRDSs) are non-magnifying reflector sights generally used with small firearms such as handguns and pistols. MRDSs use a reflective optical system to project light toward the user to see the target field and the illuminated red dot reticle. MRDSs can be either enclosed, in which all of the optical elements are completely encased by a housing, or open, in which at least a portion of the optical elements are not encased by a housing.

Controls for MRDSs are generally provided on the sides of the housing or top of the base of the MRDSs. These controls generally allow a user to adjust the brightness of the MRDS. Control location is very important. Controls should be quickly and easily accessible to a shooter in a variety of situations. When positioned on the side of the housing, the controls tend to favor right- or left-handed shooters, depending on which side the controls are on. Furthermore, controls can be blocked or inaccessible when a small firearm is holstered, making adjustments before drawing a firearm near impossible. While controls on the top of the base make for an ambidextrous MRDS, the space provided to reach the controls is limited, making it difficult to adjust the controls when wearing gloves. Because of the open MRDS's design, a user's finger will also block the emitter when using the controls. A user therefore cannot observe the brightness of the MRDS during adjustment.

It is further desirable to incorporate alternative power sources, such as solar panels, into a MRDS. However, space for multiple features, such as solar panels and ambidextrous button configurations, is limited, particularly on small sights such as MRDSs. Current designs incorporating solar panels position the solar panels on the top of the MRDS housing, resulting in the buttons being located on a side or base of the housing.

For the reasons discussed above, having controls positioned on a MRDS housing which provide ambidextrous control and do not cause the emitter to be obscured during adjustment, while still permitting solar panels to be used, is a big advantage. Similarly, having controls that are accessible while a firearm is holstered is a big advantage. Thus, there is a large need for a mounting system that can address these concerns.

SUMMARY

In one embodiment, the disclosure provides a viewing optic. In accordance with embodiments of the present disclosure, a viewing optic comprises a housing having a front side containing an optical element, a rear side containing a rear cover, a left side, a right side, and a top side; and a solar panel control assembly positioned on the top side, wherein the solar panel control assembly comprises at least one solar panel.

In an embodiment, the solar panel control assembly is a brightness control. In a further embodiment, the solar panel control assembly comprises one or more solar panels electrically connected to a printed circuit board. In a further embodiment, the solar panel control assembly comprises at least two solar panels electrically connected to a printed circuit board. In another embodiment, the solar panel control assembly comprises at least two solar panels are associated with a depressible switch positioned between the respective solar panel and the printed circuit board. In a further embodiment, the top side comprises a recess and the solar panel control assembly is contained within the recess. In another embodiment, the solar panel control assembly is at least partially housed in a membrane cover.

In a further embodiment, the solar panel control assembly comprises a solar panel and a rocker switch electrically connected to a printed circuit board.

In an embodiment, the viewing optic is a miniature red dot sight, and preferably a closed miniature red dot sight.

In another embodiment, the disclosure provides a firearm. In accordance with embodiments of the present disclosure, a firearm comprises a viewing optic, the viewing optic having a housing having a front side containing an optical element, a rear side containing a rear cover, a left side, a right side, and a top side; and a solar panel control assembly positioned on the top side, wherein the solar panel control assembly comprises at least one solar panel.

In an embodiment, the viewing optic is a miniature red dot sight, and preferably a closed miniature red dot sight. In an embodiment, the firearm is a handgun.

In an embodiment, the solar panel control assembly comprises at least two solar panels electrically connected to a printed circuit board. In a further embodiment, the at least two solar panels are associated with a depressible switch positioned between the respective solar panel and the printed circuit board. In an embodiment, the top side comprises a recess and the solar panel control assembly is contained within the recess. In another embodiment, the solar panel control assembly is at least partially housed in a membrane cover.

BRIEF DESCRIPTION OF THE DRAWINGS

Embodiments of the disclosure are disclosed with reference to the accompanying drawings and are for illustrative purposes only. The disclosure is not limited in its application to the details of construction or the arrangement of the components illustrated in the drawings. The disclosure is capable of other embodiments or of being practiced or carried out in other various ways. Like reference numerals are used to indicate like components. In the drawings.

Figure 1:
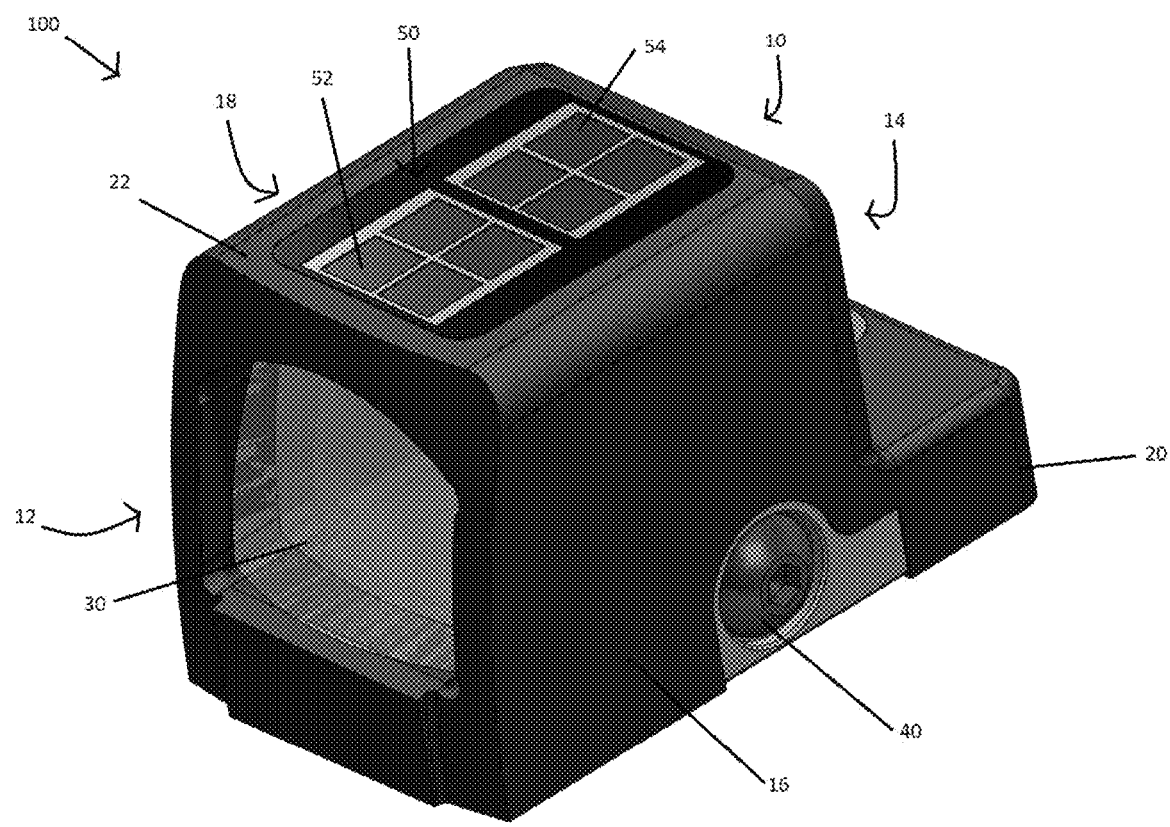
FIG. 1 is a front perspective view of a miniature red dot sight in accordance with embodiments of the present disclosure.

Before explaining embodiments of the disclosure in detail, it is to be understood that the disclosure is not limited in its application to the details of construction and the arrangement of the components set forth in the following description or illustrated in the drawings. The technology of this present disclosure is capable of other embodiments or being practiced or carried out in various ways. Also, it is to be understood that the phraseology and terminology employed herein is for the purpose of description and should not be regarded as limiting.

DETAILED DESCRIPTION

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, melt index, temperature, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, relative amounts of components in a mixture, and various temperature and other parameter ranges recited in the methods.

FIG. 1 illustrates a viewing optic 100, in accordance with embodiments of the present disclosure. In the particular embodiment shown, the viewing optic 100 is an miniature red dot sight (MRDS), and for purposes of this disclosure "viewing optic" and "MRDS" may be used interchangeably. When mounted to a firearm, the viewing optic 100 displays a reticle to facilitate alignment of a trajectory of the firearm with a target.

In the embodiment shown, the MRDS 100 has a housing 10 and a base 20. The housing 100 has a front side 12, rear side 14, left side 16, right side 18 and top side 22. The front side 12, rear side 14, left side 16, and right side 18 extend generally upwardly from the base 20. The front side 12 and rear side 14 extend between the left side 16 and right side 18. The top side 22 extends between the upper edges of each of the front side 12, rear side 14, left side 16, and right side 18. The resulting housing 10 contains the illumination system and other components which make the viewing optic functional. An optical element, in this case a lens 30, is contained in the front side 12 and a rear transparent cover (not shown), such as glass, is contained in the rear side 14. A plurality of screws, such as a mounting screw 40 and various adjustment screws (not shown), are provided at the base 20 of the housing 10. A battery (not shown) is also secured in the housing 10 and protected by a battery cap (not shown).

As shown in FIG. 1, the solar panel control assembly 50 is positioned on the top side 22 of the housing 10. In the specific embodiment shown, and with particular reference to FIG. 2, the control 50 is provided as two solar panels 52, 54, which also double as controls configured to increase the brightness of the MRDS 100 as described in further detail below. In an embodiment, each solar panel 52, 54 includes at least one, and preferably a plurality of, PV cells.

As used herein, the term "solar cell" refers to a structure including at least one photovoltaic cell (PV cell). A solar cell may also include a cover sheet, front encapsulant film, rear encapsulant film and backsheet, with the PV cell sandwiched between the front encapsulant film and rear encapsulant film. "Photovoltaic cell", "PV cell" and like terms mean a structure that contains one or more photovoltaic effect materials of any of several inorganic or organic types. For example, commonly used photovoltaic effect materials include one or more of the known photovoltaic effect materials including but not limited to crystalline silicon, polycrystalline silicon, amorphous silicon, copper indium gallium (di)selenide (CIGS), copper indium selenide (CIS), cadmium telluride, gallium arsenide, dye-sensitized materials, and organic solar cell materials. PV cells are typically employed in a laminate structure and have at least one light-reactive surface that converts the incident light into electric current. Photovoltaic cells are well known and are generally packaged into solar cells that protect the PV cells and permit their usage in their various application environments, typically in outdoor applications. PV cells may be flexible or rigid in nature and include the photovoltaic effect materials and any protective coating surface materials that are applied in their production as well as appropriate wiring and electronic driving circuitry.

Figure 3A:
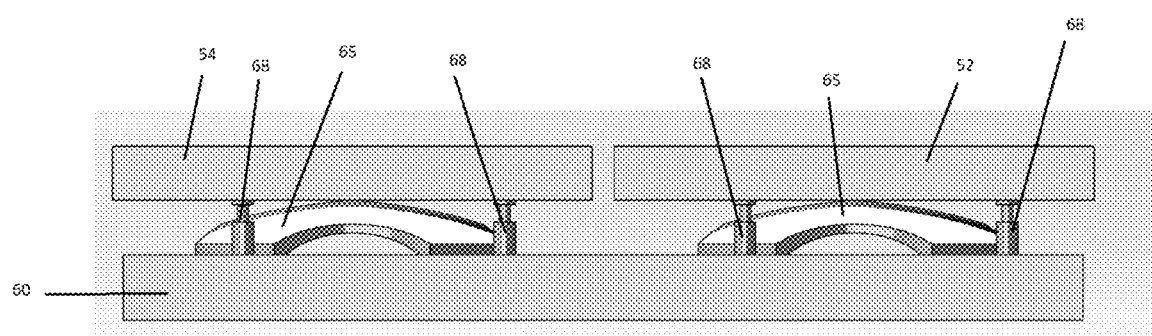
FIGS. 3A and 3B are cross-sectional views taken along line 3-3 of FIG. 2 and showing the exemplary solar panel control assembly of FIG. 2 in the neutral state and the depressed state, respectively.
Figure 3B:
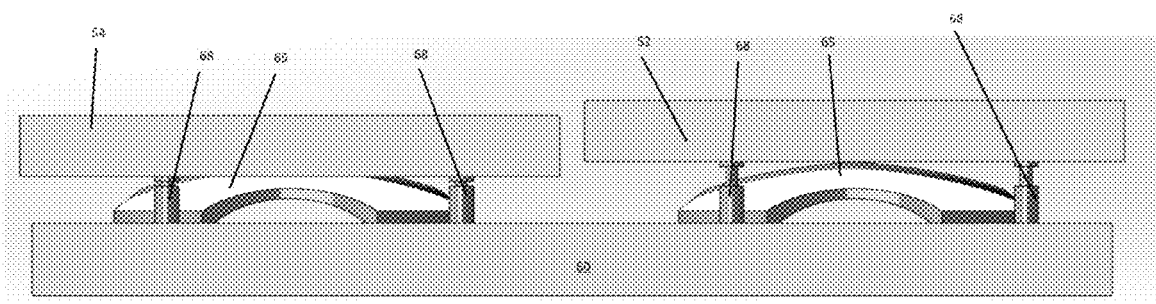

Referring to FIGS. 3A and 3B, in the embodiment shown, the solar panel control assembly 50 comprises two solar panels 52, 54 electrically connected with a printed circuit board (PCB) 60. The PCB 60 is in electrical communication with the internal mechanisms that control the particular property being adjusted, which in the present embodiment is brightness. Between each solar panel 52, 54 and the PCB 60 is an electro-mechanical switch 65. The switches 65 allow the solar panels 52, 54 to be used as buttons to control properties of the MRDS 100, such as the brightness, though the MRDS 100 may be configured such the other or additional properties are adjusted by one or more of the buttons provided on the solar panel control assembly 50. One or more spring-loaded contact pins 68 may also be provided between each of the solar panels 52, 54 and the PCB 60. In the embodiment shown, at least two pins 68 are provided between each solar panel 52, 54 and the PCB 65. The spring-loaded contact pins 68 maintain a constant electrical connection with the PCB 60 and the solar panels 52, 54, allowing the power generated from the panels 52, 54 to constantly supply the PCB 65. In some embodiments, the pins 68 may also act as alignment members to prevent the solar panels 52, 54 from rocking or falling out of alignment when the solar panels 52, 54 are actuated (pressed), such as solar panel 54 as shown in FIG. 3B.

Figure 2:
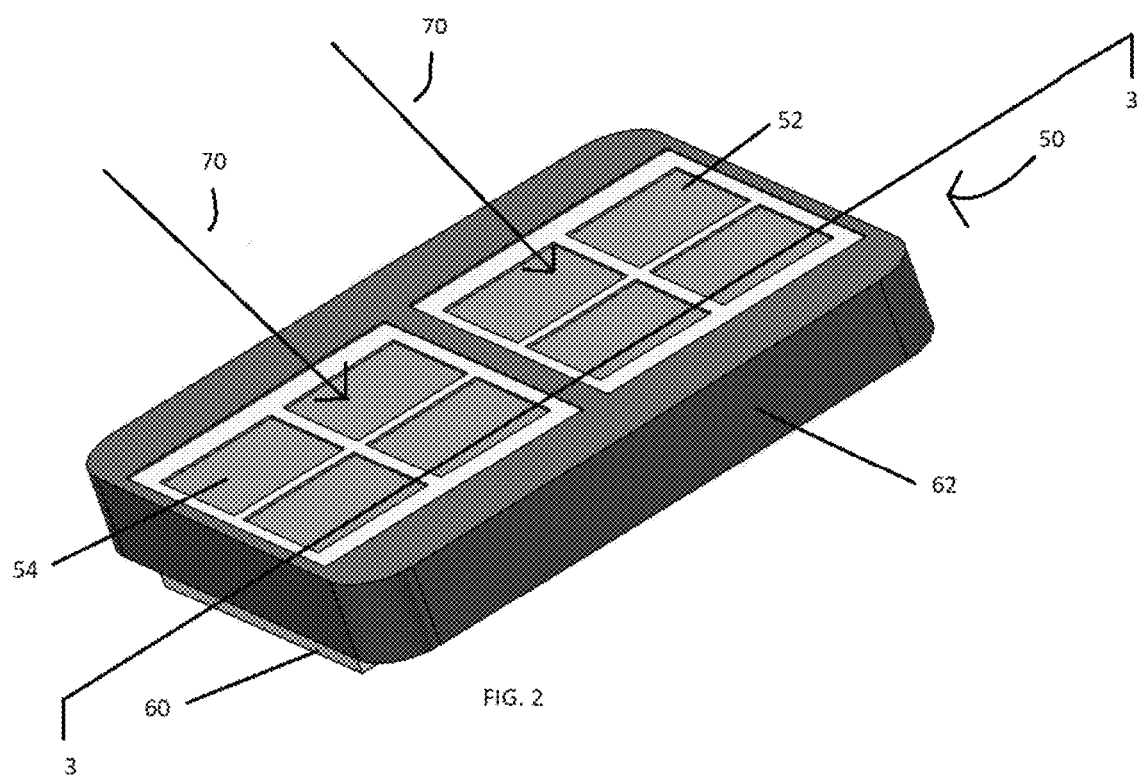
FIG. 2 illustrates an exemplary solar panel control assembly in accordance with embodiments of the present disclosure.

Referring again to FIG. 2, the solar panels 52, 54, PCB 60, switches 65 and pins 68 are surrounded by a membrane cover 62 which protects the components of the solar panel control assembly 50 from the outside elements. The membrane cover 62 may be made of any suitable material including, but not limited to, rubber, silicone, or other flexible materials which resist and remain functional in various environmental conditions (e.g., moisture, debris, wind, heat, cold, etc.). In an embodiment, the membrane cover 62 is molded around the solar panels as shown in FIG. 2, though in other embodiment the membrane cover 62 may completely encapsulate the solar panel control assembly 50 provided sufficient visible light is able to pass through to the solar panels 52, 54. The top side 22 contains a recess, and the solar panel control assembly 50 is contained within the recess.

Figure 4:
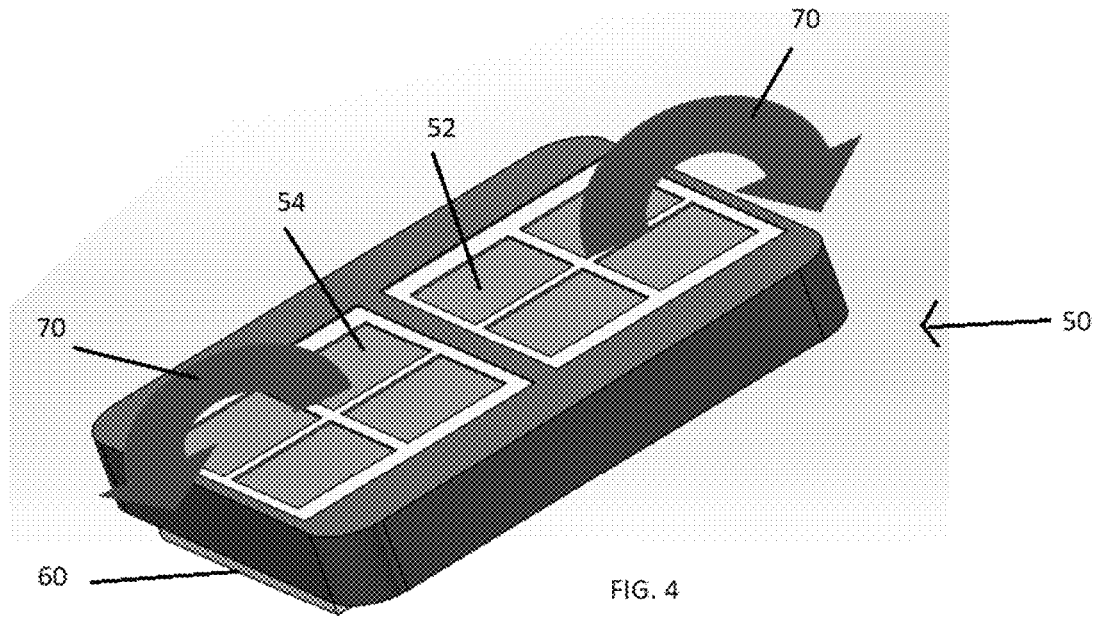
FIG. 4 shows an alternative embodiment of exemplary solar panel control assemblies in accordance with embodiments of the present disclosure.
Figure 5:
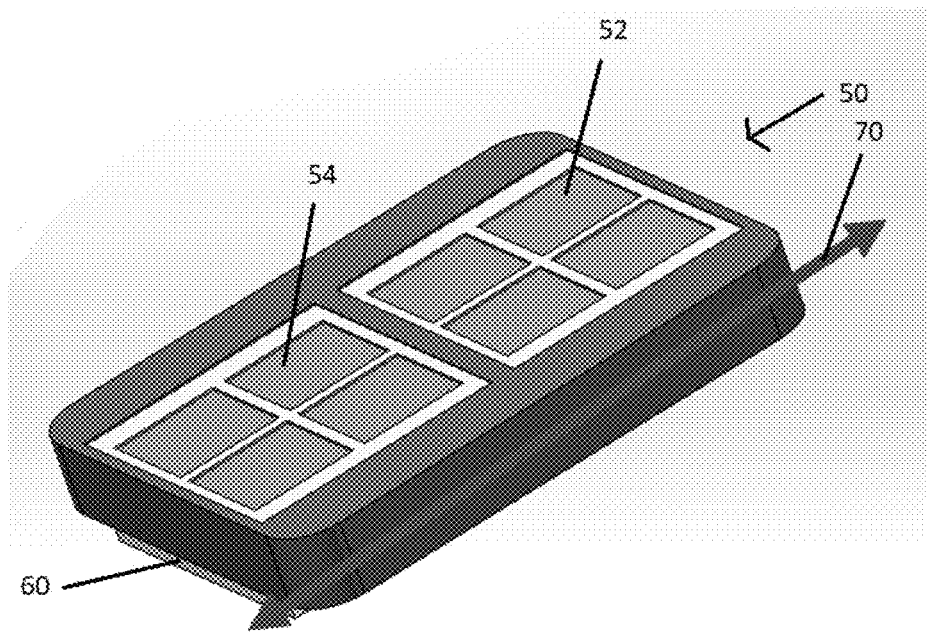
FIG. 5 shows an alternative embodiment of exemplary solar panel control assemblies in accordance with embodiments of the present disclosure.
Figure 6:
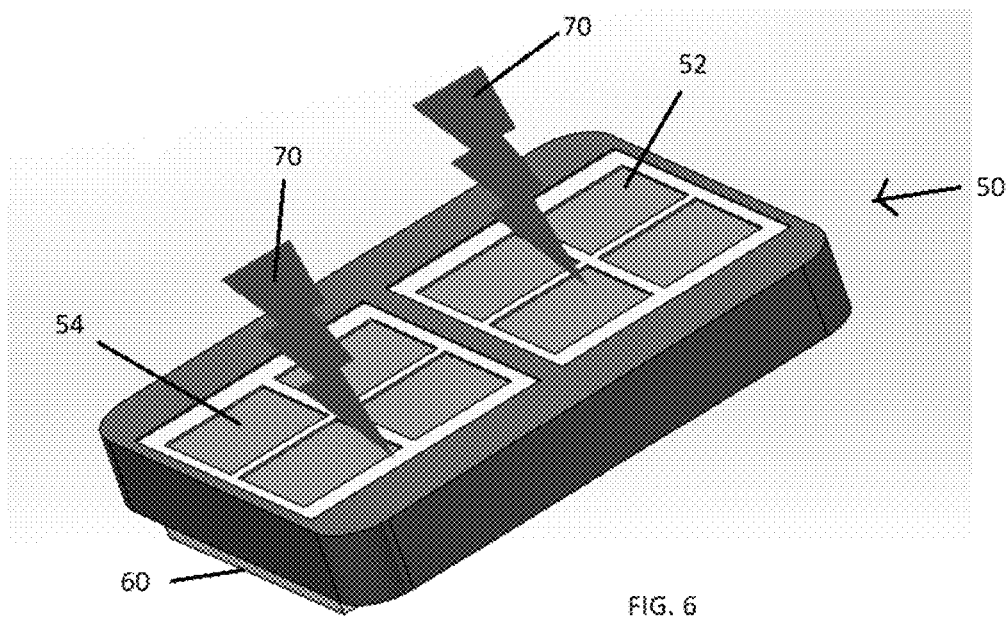
FIG. 6 shows an alternative embodiment of exemplary solar panel control assemblies in accordance with embodiments of the present disclosure.

While the embodiment described with reference to FIGS. 1-3B show a solar panel control assembly 50 in which there are two individual solar panels 52, 54 which are independently vertically linearly actuated (as shown by arrows 70), other forms of actuation may be provided. Such as, for example, actuation by toggle switch or tilting as two independent units as shown in FIG. 4 (movement indicated by arrows 70) or as a single unit, actuation by translation whether as a single unit as shown in FIG. 5 (movement indicated by arrows 70) or as two independent units, or actuation by capacitive switch as shown in FIG. 6 (movement indicated by arrows 70). Other actuation means, including, but not limited to, rotation, single depressible buttons, etc.

In the embodiment shown, the housing 10 in combination with the solar panel control assembly 50 forms a shell to protect the lens 30, rear cover 32 and internal components of the viewing optic 100. In particular, in the embodiment shown, the membrane cover 62, being a softer material than the surrounding housing 10, additionally creates a "buffer" directly above the lens 30 and rear cover 32. Should the MRDS 100 be dropped directly on its top side 22, this "buffer" redirects forces around the lens 30 and rear cover 32 and through the left and right sides 16, 18 of the housing.

By positioning the solar panel control assembly 50 on the top side 22 of the housing 10, right handed and left handed users can equally access the control 50. This is in direct contrast to providing one or more controls on a side of the housing. Also, the solar panel control assembly 50 on the top side 22 of the housing 10 is not blocked or crowded by other structures, allowing a user to easily access the solar panel control assembly 50 even while wearing gloves. On existing MRDSs which have the controls positioned on the top surface of the base 20, such as, for example, with open MRDSs, any buttons or other adjustment means are generally near to the lens and/or protective cover. This makes the adjustment area very tight and difficult to operate with gloves. It also creates the opportunity for scratching, smudging, and otherwise obstructing the lens and LED.

Positioning the solar panel control assembly 50 on the top side 22 of the housing also allows a user to make adjustments with the firearm in its holster, which is not always possible with controls positioned on the side or base of a MRDS. For example, if a competition shooter wants to make a brightness adjustment to compensate for some incoming cloud cover, the shooter is not able to remove the firearm from the holster to make this adjustment per the rules of the match, but would still be able to make the adjustment with the MRDS 100 disclosed herein having the solar panel control assembly 50 on the top side 22 of the housing 10.

In the embodiment shown, the viewing optic 100 is a closed MRDS, meaning the light path is completely contained within the housing. In further embodiments, a portion of the light path may be exposed. In either case, it will be appreciated that positioning the solar panel control assembly 50 on the top side 22 of the housing 10 prevents a user from blocking the light path and the user's view when making adjustments.

Although the mounting system is described with reference to a MRDS, a variety of other viewing optics may be provided with controls on a top surface, as describe herein. As used herein, the term "viewing optic" refers to an apparatus used by a shooter or a spotter to select, identify or monitor a target, including, for example, and not limited to, rifle scopes, red dot optics, binoculars, range finders, and other opto-mechanical devices. The "viewing optic" may rely on visual observation of the target, or, for example, on infrared (IR), ultraviolet (UV), radar, thermal, microwave, or magnetic imaging, radiation including X-ray, gamma ray, isotope and particle radiation, night vision, vibrational receptors including ultra-sound, sound pulse, sonar, seismic vibrations, magnetic resonance, gravitational receptors, broadcast frequencies including radio wave, television and cellular receptors, or other image of the target. The image of the target presented to the shooter by the "viewing optic" device may be unaltered, or it may be enhanced, for example, by magnification, amplification, subtraction, superimposition, filtration, stabilization, template matching, or other means. The target selected, identified or monitored by the "viewing optic" may be within the line of sight of the shooter, or tangential to the sight of the shooter, or the shooter's line of sight may be obstructed while the target acquisition device presents a focused image of the target to the shooter. The image of the target acquired by the "viewing optic" may be, for example, analog or digital, and shared, stored, archived, or transmitted within a network of one or more shooters and spotters by, for example, video, physical cable or wire, IR, radio wave, cellular connections, laser pulse, optical, 802.11b or other wireless transmission using, for example, protocols such as html, SML, SOAP, X.25, SNA, etc., Bluetooth™, Serial, USB or other suitable image distribution method. In one embodiment, the viewing optic is a MRDS, and more particularly a closed MRDS.

While various embodiments of the MRDS have been described in detail, it should be apparent that modifications and variations thereto are possible, all of which fall within the true spirit and scope of the invention. With respect to the above description then, it is to be realized that the optimum dimensional relationships for the parts of the disclosed technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:
1. A viewing optic comprising:
 a housing having a front side containing an optical element, a rear side containing a rear cover, a left side, a right side, and a top side; and
 a solar panel control assembly positioned on the top side, wherein the control comprises at least one solar panel, and further wherein the solar panel is a button for brightness control.

2. The viewing optic of claim 1, wherein the solar panel control assembly comprises at least two solar panels electrically connected to a printed circuit board.

3. The viewing optic of claim 2, further comprising a depressible switch positioned between the at least two solar panels and the printed circuit board.

4. The viewing optic of claim 1, wherein the top side comprises a recess and the solar panel control assembly is contained within the recess.

5. The viewing optic of claim 1, wherein the solar panel control assembly is at least partially housed in a membrane cover.

6. The viewing optic of claim 1, wherein the viewing optic is a miniature red dot sight.

7. The viewing optic of claim 6, wherein the miniature red dot sight is a closed miniature red dot sight.

8. A firearm comprising:
    a viewing optic, the viewing optic having
        a housing having a front side containing an optical element, a rear side containing a rear cover, a left side, a right side, and a top side; and
        a solar panel control assembly positioned on the top side, wherein the control comprises at least one solar panel, and further wherein the solar panel is button for brightness control.

9. The firearm of claim 8, wherein the viewing optic is a miniature red dot sight.

10. The firearm of claim 9, wherein the viewing optic is a closed miniature red dot sight.

11. The firearm of claim 8, wherein the firearm is a handgun.

12. The firearm of claim 8, wherein the solar panel control assembly comprises at least two solar panels electrically connected to a printed circuit board.

13. The firearm of claim 12, further comprising a depressible switch positioned between the at least two solar panels and the printed circuit board.

14. The firearm of claim 8, wherein the top side comprises a recess and the solar panel control assembly is contained within the recess.

15. The firearm of claim 8, wherein the solar panel control assembly is at least partially housed in a membrane cover.

\* \* \* \* \*